United States Patent
Pecen et al.

(10) Patent No.: US 7,796,605 B2
(45) Date of Patent: Sep. 14, 2010

(54) APPARATUS, AND ASSOCIATED METHOD, FOR FACILITATING RADIO SUB-SYSTEM SELECTION IN A PACKET RADIO COMMUNICATION SYSTEM

(75) Inventors: Mark Pecen, Waterloo (CA); Matthias Wandel, Waterloo (CA); Atul Asthana, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1082 days.

(21) Appl. No.: 11/460,814

(22) Filed: Jul. 28, 2006

(65) Prior Publication Data

US 2008/0025317 A1 Jan. 31, 2008

(51) Int. Cl.
*H04L 12/56* (2006.01)
(52) U.S. Cl. .................. 370/395.21; 370/252
(58) Field of Classification Search .......... 370/395.1, 370/395.2, 395.21, 248, 252; 455/456.5, 455/466, 412.1–2, 436–439
See application file for complete search history.

(56) References Cited

U.S. PATENT DOCUMENTS

| | | | | |
|---|---|---|---|---|
| 5,923,650 | A | * | 7/1999 | Chen et al. .................. 370/331 |
| 6,393,276 | B1 | * | 5/2002 | Vanghi .................. 455/422.1 |
| 2005/0026624 | A1 | * | 2/2005 | Gandhi et al. .................. 455/453 |
| 2006/0135150 | A1 | * | 6/2006 | Oh .................. 455/425 |
| 2007/0142064 | A1 | * | 6/2007 | Gutowski .................. 455/456.5 |
| 2008/0188228 | A1 | * | 8/2008 | Pecen et al. .................. 455/449 |
| 2008/0248807 | A1 | * | 10/2008 | Kim et al. .................. 455/453 |

FOREIGN PATENT DOCUMENTS

| GB | 2388276 A | 5/2003 |
|---|---|---|
| WO | 0165864 A2 | 7/2001 |
| WO | 2004028175 A1 | 4/2004 |

* cited by examiner

*Primary Examiner*—CongVan Tran

(57) ABSTRACT

Apparatus, and an associated method, for selecting a radio subsystem in a radio communication system. Selection is made in a manner that optimizes better the selection for communication of data pursuant to a data communication service. A network capacity analyzer includes a capacity indicia collector that collects metric information associated with communication system capacities. Network information is collected pertaining, e.g., to a backhaul network, a radio access network, and a core network of the radio communication system. The collected information is provided to an aggregate capacity determiner that determines the aggregate capacities of the communication system. Such values are provided to a mobile station. The values are used pursuant to reselection procedures to select a radio subsystem through which to communicate.

22 Claims, 3 Drawing Sheets

APPARATUS, AND ASSOCIATED METHOD, FOR FACILITATING RADIO SUB-SYSTEM SELECTION IN A PACKET RADIO COMMUNICATION SYSTEM

The present invention relates generally to a manner by which to select, or reselect, a base transceiver station, or other radio sub-system, through which to communicate packet data, such as data communicated in a GSM/GPRS/EDGE communication system. More particularly, the present invention relates to apparatus, and an associated method, by which to select a radio sub-system based upon a combination of signal strength or quality and available capacity.

More optimal selection of the radio sub-system is provided as the criteria used to make the selection is based better to optimize selection when data, typically of a bursty character, i.e., transmitted in bursts, is communicated. Sub-optimal selection criteria, such as that conventionally utilized to select, or reselect a radio sub-system pursuant to circuit-switched, voice communications, or other non-bursty communications is not relied upon; rather, selection is based upon the unique characteristics and requirements of bursty communications, such as the need for allocation of multiple, contiguous timeslot allocations.

BACKGROUND OF THE INVENTION

Use of mobile radio communication systems is pervasive in modern society. The network infrastructures of cellular communication systems, for instance, have been deployed over significant portions of the populated areas of the world, readily accessible through which to communicate. Cellular communication systems generally make efficient use of bandwidth allocated thereto for communications as relatively low power signals are generated to effectuate communications between mobile stations and the network infrastructure of such systems. The network infrastructure of a cellular communication system includes a plurality of spaced-apart base stations, each defining a cell. By transmitting only low-power signals, the same channels are reusable within relatively short distances. And, channels are reused according to a so-called, cell re-use scheme.

As a mobile station moves, or is otherwise repositioned, within an area encompassed by a cellular communication system, there is sometimes a need to hand-off communications between different base transceiver stations or other radio sub-systems entities to permit continued communication of a mobile station. In a hand-off of communications between cells, i.e., the radio sub-systems that define such cells, a decision must be made both as to which radio sub-system to hand off communications and when to hand-off the communications.

A GSM (Global System for Mobile communications) is an exemplary cellular communication system. A GSM system operates in general conformity with a GSM operating specification that sets forth, amongst other things, operating protocols and requirements required of devices operable in such a system. GSM technologies were originally, based upon circuit-switched technologies and provided circuit-switched connections between communication endpoints. However, GPRS (General Packet Radio System) and, more recently, EDGE (Enhanced Data for GSM Evolution) capabilities have been added to provide high-speed, variable-rate data communication services that make use of packet-switched technologies. EDGE is, in essence, a superset of GPRS and provides the capability of packet-based user data interchange by way of the network infrastructure of a GSM network and a radio air interface defined therein. EDGE and GPRS data communications regularly exhibit characteristics that differ with the characteristics of voice communications, conventionally communicated by way of a GSM network using circuit-switched connections and technologies. One significant characteristic, in general, of data communications is their bursty nature. That is to say, data is typically communicated in bursts. And, in a system that utilizes time slots, such as GSM, multiple, contiguous time slots are sometimes needed to communicate the data in a burst.

In existing GSM operation, hand-off is generally determined based upon determination of RSSI (Received Signal Strength Indication) levels of signals communicated by a base transceiver station or other radio sub-system element of the network infrastructure of the GSM system. Determining to where, and when, to hand-off communications based upon RSSI levels works well when voice information is communicated in a GSM system. Agile handover mechanisms are presently available to move voice communications using circuit-switched technologies amongst radio channels when signal quality degrades, or bit error probability increases, beyond selected thresholds. However, such existing hand-off mechanisms are sub-optimal when selecting hand-off of data communications. That is to say, corresponding, agile hand-off mechanisms are not part of the GPRS/EDGE specifications. Data communications, as just-mentioned, regularly require multiple, contiguous time slot allocations for their effectuation, not single time slot allocations, more typically allocated in voice communications.

A manner better to optimize radio sub-system selection for data communications, taking into account the characteristics regularly exhibited by, or required of, data that is to be communicated would therefore be advantageous.

It is in light of this background information related to radio sub-system selection in a radio communication system that the significant improvements of the present invention have evolved.

DETAILED DESCRIPTION

Figure 1:
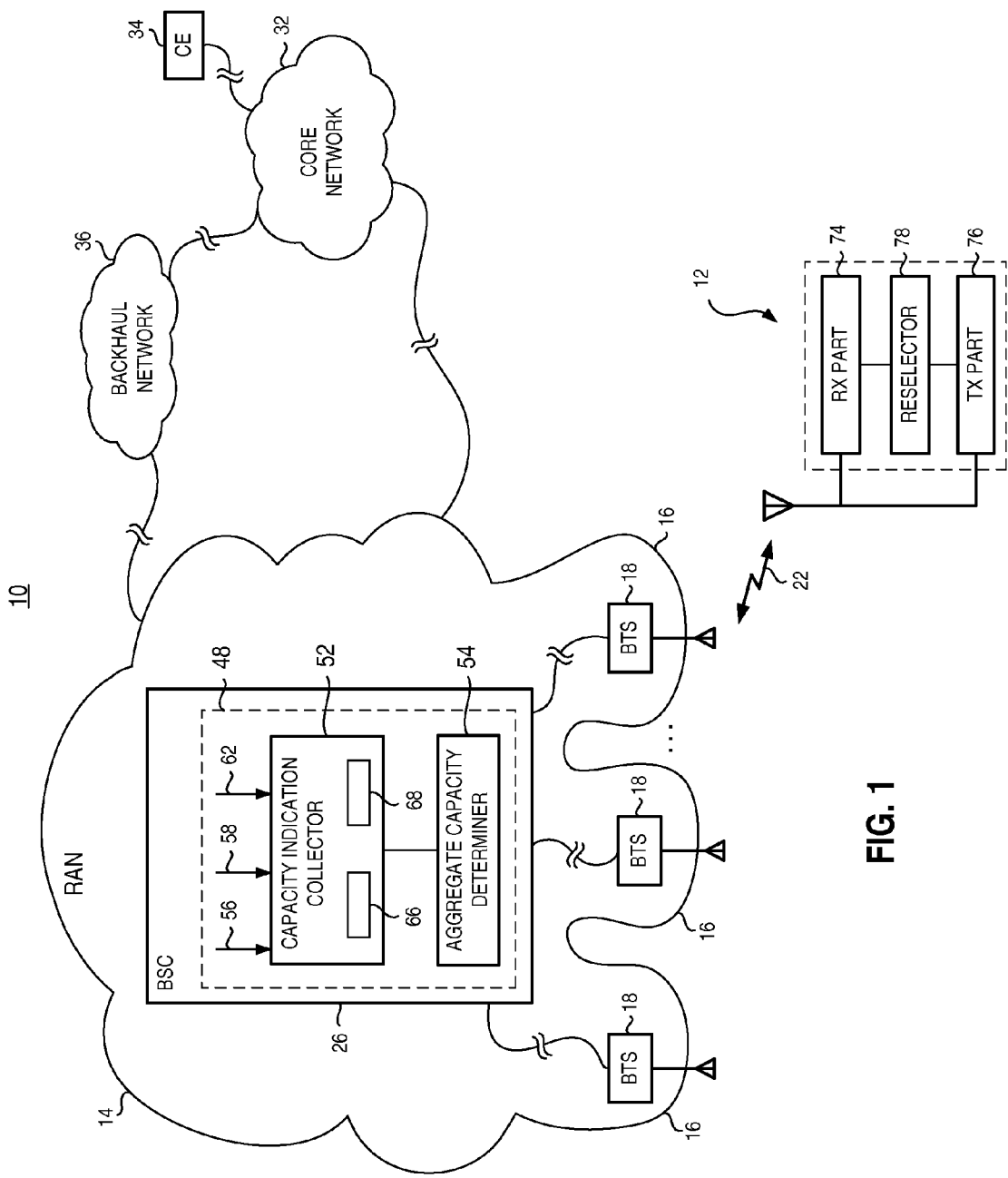
FIG. 1 illustrates a functional block diagram of a radio communication system in which an embodiment of the present invention is operable.

The present invention, accordingly, advantageously provides apparatus, and an associated method, by which to select, or reselect, a base transceiver station, or other radio sub-system, through which to communicate packet data, such as that communicated in a GSM/GPRS/EDGE communication system.

Through operation of an embodiment of the present invention, a manner is provided by which to select a radio sub-system based upon a combination of signal strength or quality and available capacity.

In one aspect of the present invention, more optimal selection of the radio sub-system is provided as selection is based upon criteria to optimize better the radio sub-system selection. The selection criteria includes criteria specific to data communication characteristics. Namely, the criteria takes into account the typical, bursty nature of data communications in which data is regularly transmitted in bursts that require multiple, contiguous timeslot allocations. Selection criteria used pursuant to cell selection and reselection pursuant to circuit-switched, voice communications are replaced with selection criteria that optimizes better the selection of radio sub-system based on criteria of importance to data communications.

In another aspect of the present invention, a network capacity analyzer is positioned to be provided with indicia of radio communication system capacities and, upon their reception, to analyze the radio communication system capacities. The analysis is performed, for instance, by combining the received indicia either on a temporal basis or on a type basis, or a combination thereof.

In another aspect of the present invention, the radio communication system capacity comprises core network capacity metrics. That is to say, the radio communication system includes a core network and the indicia identify core network communication capacity, or an indication relevant thereto.

In another aspect of the present invention, the radio communication system indicia comprise backhaul capacity metrics. That is to say, the radio communication system includes a backhaul network, and the backhaul capacity metrics are indicative of the backhaul network capacity or indications representative thereof.

In another aspect of the present invention, the radio communication system capacity indicia comprise radio system capacity metrics. That is to say, the radio communication system includes a radio access network part, and the radio system capacity metrics comprise indications of radio access network capacities or indications representative thereof.

Analysis performed by the network capacity analyzer combines, in a selected manner, the indications provided thereto and forms a value representative of available capacity in a target radio sub-system or sub-systems. The quantized value is quantized into a selected level of precision. Combining performed by the analyzer includes, for instance, forming a product value of one or more of the received indications or representations thereof. The quantized value is formed, e.g., of a four-bit value between 0 and 1.

The network capacity analyzer is embodied at the radio access network, for example, at a base station controller, or distributed amongst more than one functional entity of the radio access network, or elsewhere. When network-positioned, once the available capacity value is determined, the value is provided to a mobile station by way of a radio air interface formed therebetween. The available capacity value is sent, e.g., as part of a control message sent on a control channel.

In another aspect of the present invention, additional values are sent together with, or separate from, the determined value. In one implementation, both a minimum signal threshold value, such as a minimum RSSI value or a maximum permitted bit error probability or rate value, is sent. In another implementation, a minimum capacity threshold value is sent. And, in one implementation, both a minimum signal threshold and a minimum capacity threshold value is sent.

In another aspect of the present invention, the mobile station includes a detector adapted to detect a control message sent thereto. The control message includes the available capacity value communicated as part of, e.g., a control message sent on a control channel by a radio access network. The detected value, or an indication thereof, is provided to a radio sub-system selector. The selector performs radio sub-system selection of a radio sub-system of the radio communication system with which the mobile station shall communicate pursuant to a communication service. Because the available capacity value is created and based upon, criteria of importance to data communications, resultant radio sub-system selection, based upon the available capacity value, is made better to optimize selection for data communications.

In these and other aspects, therefore, apparatus, and an associated method, is provided for facilitating radio sub-system selection in a radio communication system having a plurality of radio sub-systems. A capacity indication collector is adapted to receive indications of radio communication system capacities. The collector is configured to collect the indications received thereat. An aggregate capacity determiner is adapted to receive values of the indications collected by the capacity indication collector. The aggregate capacity determiner is configured to determine an aggregate capacity value responsive to the indications collected by the capacity indication collector. The aggregate capacity value is used pursuant to the radio sub-system selection.

Referring first, therefore, to FIG. 1, a radio communication system, shown generally at 10, provides for radio communications with mobile stations, of which the mobile station 12 is exemplary. In the exemplary implementation, the communication system includes portions that are operable in general conformity with the operating protocols and procedures set forth in specifications associated with the GSM/GPRS/EDGE (Global System for Mobile communications/General Packet Radio Service/Enhanced Data for GSM Evoluation). While the following description shall describe exemplary operation of the communication system with respect to its exemplary implementation, the communication system, more generally, is representative of any of various types of radio communication systems that provide for data communication services. The following description of the exemplary embodiment is, therefore, by way of example only. And, with appropriate alterations, the functional entities shown to form parts of the communication system in FIG. 1 are representative of corresponding entities in other types of data radio communication systems.

The mobile station 12 is permitting of movement such that at successive times, the mobile station is positioned at successive locations throughout an area encompassed by the communication system. The movement of the mobile station is permitted, both between times during which the mobile station is used to effectuate a data communication service as well as, also, movement during the effectuation by the mobile station of a data communication service.

The network infrastructure of the radio communication system includes a radio access network 14 that includes a plurality of radio sub-system portions 16. The radio sub-system portion 16 each include a base transceiver station (BTS) 18, or like-type device that is permitting of transceiving communication signals by way of a radio air interface, here represented by the arrows 22, with a mobile station 12 when the stations 12 and 18 are in communication range of one another. As the mobile station moves, the mobile station is positioned in coverage areas, or cells, defined by successive ones of the base transceiver stations. That is to say, the mobile station is positionable in communication connectivity with successive ones of the radio sub-systems. Communication handoffs are performed to permit communication, or continued communication, as the mobile station enters into the coverage area of a new radio sub-system and departs the coverage area of an old radio sub-system. To handoff communications in a most-optimal manner, the handoff must be to the correct radio sub-system and at an appropriate handoff time, that is, a time at which handoff is most appropriately effectuated.

The radio access network is here further shown to include a control entity, identified as a base station controller (BSC) 26 that operates, amongst other things, to control operation of the base transceiver stations of a group of radio sub-systems that are coupled to the controller.

The radio access network is coupled in conventional manner with a core network 32 that provides communication connectivity with a communication endpoint, here represented by a communication endpoint (CE) 34 with which data communications are effectuated with the mobile station 12 pursuant to performance of a data communication service.

And, the radio communication system also includes a backhaul network 36. The backhaul network is of general, conventional construction that provides high-bandwidth, inter-network connections to support communication traffic, both voice traffic and data traffic, communicated during operation of the communication system.

As noted above, communications with the mobile station 12 are handed off between radio sub-systems so that the mobile station is able to communicate when positioned in different coverage areas defined by different ones of the radio sub-systems. Conventional handoff selection schemes, however, are conventionally configured to optimize circuit-switched, voice communications, not data communications. Data communications exhibit, typically, characteristics dissimilar with those of circuit-switched, voice communications including, e.g., the typically bursty nature of data communications. Accordingly, the network infrastructure includes apparatus 48 of an embodiment of the present invention. In the exemplary implementation, the apparatus 48 is embodied at the base station controller, or other control entity of the radio access network. In other implementations, the apparatus is positioned elsewhere, or portions thereof are distributed amongst different entities of the communication system. The elements of the apparatus are functionally represented, implementable in any desired manner, including, for instance, by algorithms executable by processing circuitry.

The apparatus forms a network capacity analyzer including a capacity indication collector 52 and an aggregate capacity determiner 54. The collector is configured to receive input indications, here represented to be provided by way of the lines 56, 58, and 62. The line 56 is representative of indications of core network communication capacity, values of which are representative of communication capacity in the core network. The line 58 is representative of indications of backhaul network communication capacity, values of which are representative of communication capacity in the backhaul network. And, the line 62 is representative of indications of radio network communication capacity, values of which are representative of communication capacity in various parts of the radio access network including the radio sub-systems thereof. Collected values collected by the collector 52 are provided to the aggregate capacity determiner 54. The values provided to the determiner are, for example, averaged, or aggregated, to provide a temporal, rather than instantaneous, indication of communication characteristics. That is to say, when the values are averaged, or smoothed over time, the detector operates to perform such averaging and smoothing and the averaged or smoothed indications are provided to the determiner.

In the exemplary implementation, the apparatus forming the network capacity analyzer further includes elements 66 and 68 that contain values of minimum signal threshold levels and minimum capacity threshold levels, respectively. The minimum signal threshold level identifies the minimum permissible signal strength (RSSI), bit error probability (BEP), or other signal threshold level indicia. And, the minimum capacity threshold defines a value corresponding to a minimum capacity level of the type determined by the aggregate capacity determiner 54.

In operation, a quantized value of the aggregate capacity determined by the determiner 54 is caused to be broadcast by a base transceiver station 18 of a radio subsystem 16 in a manner to permit its detection by a mobile station when positioned within the coverage area defined by the radio subsystem. The value forms, for instance, a four-bit value between zero and one and is broadcast on a control channel that is monitored by the mobile station. In the exemplary implementation, values of the minimum signal and capacity thresholds contained at the element 66 and 68 are also provided to the mobile station by way of the control channel. As different radio subsystems exhibit different capacities, the values broadcast by the different radio subsystems differ.

The mobile station 12 includes conventional transceiver circuitry, here represented by a receive part 74 and a transmit part 76. The mobile station further includes a reselector 78 that is coupled to the receive part to receive indications of the aggregate capacity values, and other information, broadcast thereto and used pursuant to reselection of the radio subsystem with which the mobile station communicates. And, responsive to reselection made, if any, made by the reselector, the mobile station is caused to request, or otherwise to initiate or effectuate handoff to a new radio subsystem.

In the exemplary implementation, the aggregate capacity determined by the determiner 54 is formed of a product of the collected metric information, that is to say, the information provided on the lines 56, 58, and 62. The determiner multiplies values provided thereto to form a product, and the product forms the aggregate capacity value. In one implementation, the values are weighted by weighting factors to provide relative, greater or lesser, significance to certain of the values provided on the separate lines. The values determined by the capacity determiner are quantized to a selected level of precision, e.g., to form a four-bit value between the values of zero and one. In this implementation, the determiner further includes a quantizer for quantizing the product value.

And, in the exemplary implementation, the reselector is provided with an indication of the value of the aggregate capacity determined by the determiner as well as the minimum threshold values also broadcast thereto. And, a sorting and optimization procedure is carried out by the reselector. If the minimum signal threshold, e.g., the RSSI of a radio subsystem appears in a list of strongest cells and the measured value of a signal sent by the radio subsystem, as measured at the mobile station, exceeds the minimum selection threshold, then the radio subsystem is eligible, that is to say, becomes a candidate for capacity-based cell selection. The strongest cell having the highest capacity is selected. And, in the exemplary implementation, a radio subsystem is selectable further only if the aggregate capacity is beyond the minimum capacity threshold value. In other words, both the signal strength and the aggregate capacity must be better than the minimum threshold levels.

Reselection is carried out according to the following procedure in the exemplary implementation:

---

Figure 2:
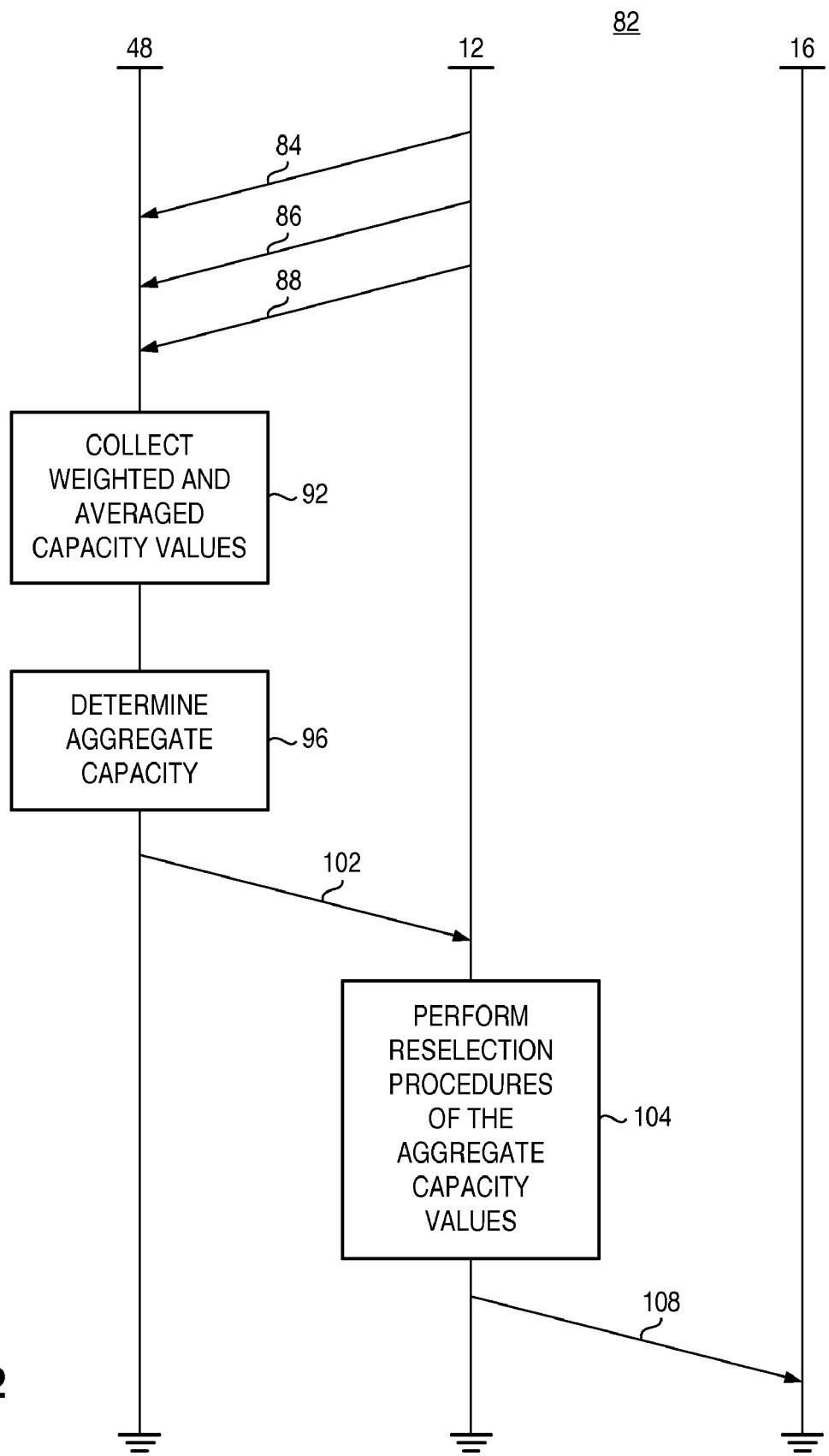
FIG. 2 illustrates a message sequence diagram representative of signaling generated during operation of the communication system shown in FIG. 1.

Sort $c(0 ... N)$ by RSSI
$\forall i, m = R_i C_i$
IF($R_i \geq T_{RSSI} \wedge C_i \geq C_{MIN}$)
    Select cell $c(i)$ having max(m)
ELSE
    Select cell $c(i)$ having max(R)
ENDIF Where:

c(0 . . . N)=Adjacent cells in strongest cell list, to be sorted by RSSI $R_i$=Received signal strength indication (RSSI) of cell i $C_i$=Available capacity metric of cell i received from the network $C_{MIN}$=Minimum capacity threshold of cell i received from the network $T_{RSSI}$=Minimum signal strength threshold of cell i received from the network m=Cell selection metric=product of signal strength and available capacity FIG. 2 illustrates a message sequence diagram, shown generally at 82, representative of exemplary operation of the communication system 10 shown in FIG. 1 pursuant to operation of an embodiment of the present invention. Here, metric information relating to the radio access network, the core network, and the backhaul network, indicated by the segments 84, 86, and 88, are provided to the analyzer 48 and such values, weighted and averaged, if desired, are collected, indicated by the block 92. Then, and as indicated by the block 96, the aggregate capacity value is determined. Determination of the aggregate capacity value is made, for instance, by forming a product of the values of the individual metrics.

Then, and as indicated by the segment 102, the aggregate capacity value is broadcast for detection by the mobile station. The segment 102 is also representative of additional information, such as values of a minimum signal threshold and of a minimum capacity threshold to the mobile station. The mobile station performs reselection procedures, indicated at the block 104, that are based on the aggregate capacity values broadcast thereto. Responsive to the reselection procedures, selectably, the mobile station initiates reselection of the radio subsystem. Initiation by the mobile station of the reselection is indicated by the segment 108.

Figure 3:
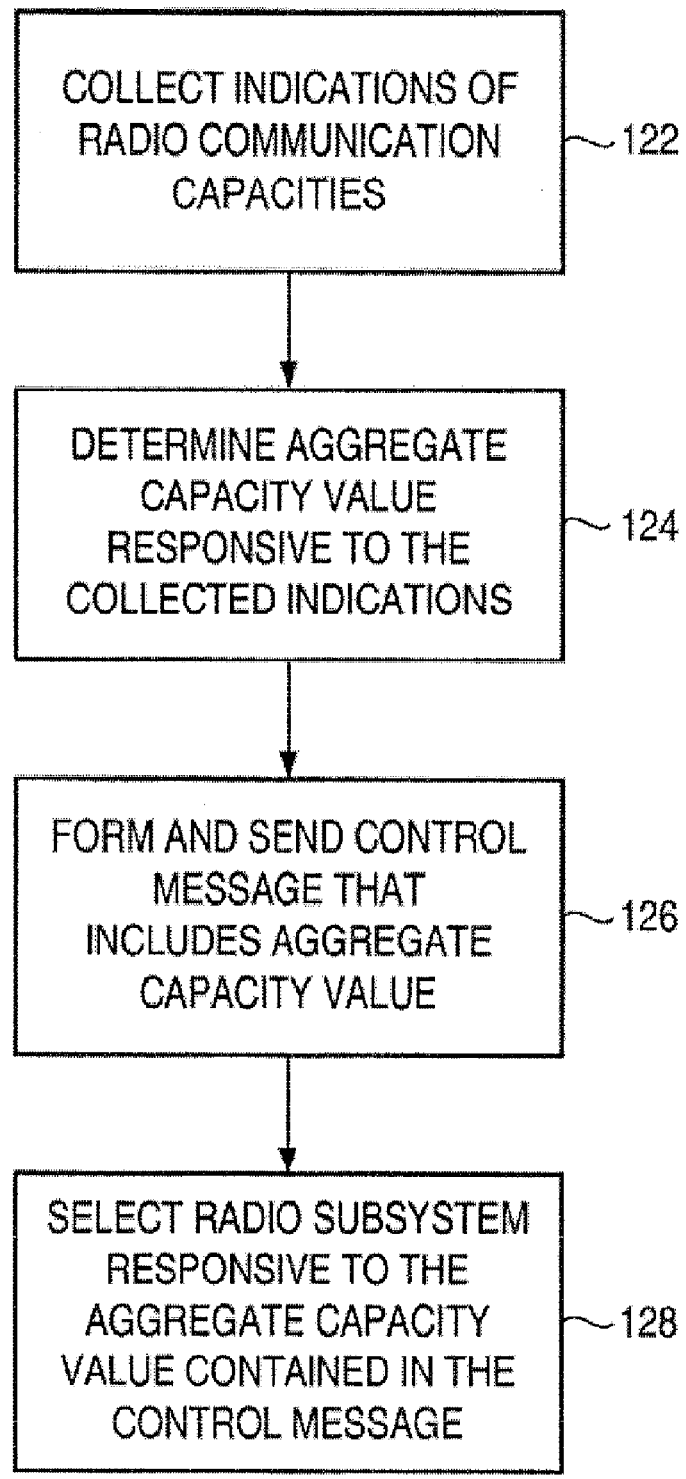
FIG. 3 illustrates a method flow diagram representative of the method of operation of an embodiment of the present invention.

FIG. 3 illustrates a method flow diagram, shown generally at 118, representative of the method of operation of an embodiment of the present invention. The method facilitates radio subsystem selection in a radio communication system having a plurality of radio subsystems.

First, and as indicated by the block 122, indications of radio communication system capacities are collected. Then, and as indicated by the block 124, an aggregate capacity value is determined responsive to the indications that have been collected. The aggregate capacity value is used pursuant to the radio subsystem selection.

Then, and as indicated by the block 126, a control message is formed and sent that includes the aggregate capacity value. And, as indicated by the block 128, the radio subsystem is selected responsive to the aggregate capacity value contained in the control message. Thereby, an improved manner by which to select the radio subsystem to which to handoff communications pursuant to a data communication service is provided. More optimal selection is permitted, in contrast to selection procedures designed to optimize voice communications.

The previous descriptions are of preferred examples for implementing the invention, and the scope of the invention should not necessarily be limited by this description. The scope of the present invention is defined by the following claims.

What is claimed is:

1. Apparatus for facilitating radio sub-system selection in a radio communication system having a plurality of radio sub-systems, said apparatus comprising:

a capacity indication collector adapted to receive signals that are indications of radio communication system capacities, said received signals indicating a core network communications capacity, a backhaul network communications capacity, and a radio network communications capacity, said capacity indication collector configured to collect the capacity indications received thereat and to forward the indications to an aggregate capacity determiner; and said aggregate capacity determiner adapted to receive from the capacity indication collector values indicative of said core network communications capacity, said backhaul network communications capacity, and said radio network communications capacity, said aggregate capacity determiner configured to determine an aggregate capacity value, said aggregate capacity value being the product of the capacity indications received by the aggregate capacity determiner the aggregate capacity value being broadcast for use by a mobile station to select a radio sub-system.

2. The apparatus of claim 1 wherein the radio communication system comprises a core network capable of providing communication connectivity with a communication endpoint.

3. The apparatus of claim 1 wherein the radio communication system comprises a backhaul network capable of providing inter-network connections within said radio communication system.

4. The apparatus of claim 1 wherein the radio communication system comprises a radio access network that includes a plurality of radio sub-systems that provide radio communications to mobile stations.

5. The apparatus of claim 1 wherein said capacity indication collector collects indications of a plurality of different radio communication system capacities and wherein the aggregate capacity value determined by said aggregate capacity determiner comprises a value calculated from a combination of the plurality of the different radio communication system capacities.

6. The apparatus of claim 5 wherein the combination of the plurality of the different radio communication system capacities comprises a product of at least some of the plurality of the different radio communication system capacities and a quantized value of said product.

7. The apparatus of claim 5 wherein the combination of the plurality of the different radio communication system capacities comprises a product of weighted values of a plurality of the different radio communication system capacities.

8. The apparatus of claim 1 further comprising a quantizer adapted to receive the aggregate capacity value determined by said aggregate capacity determiner, said quantizer configured to quantize the aggregate capacity-value.

9. The apparatus of claim 1 further comprising a control message generator adapted to receive a representation of the aggregate capacity value, said message generator configured to generate a control message that includes a value indicative of the aggregate capacity value.

10. The apparatus of claim 9 wherein the radio communication system comprises a mobile station and wherein the control message generated by said message generator is broadcast to the mobile station.

11. The apparatus of claim 10 wherein said mobile station comprises a radio sub-system selector adapted to receive the control message generated by said message generator.

12. The apparatus of claim 1 wherein the capacity indication collector includes a minimum signal strength value.

13. The apparatus of claim 12 further comprising a control message generator adapted to receive a representation of the aggregate capacity value and the minimum signal strength value, said control message generator configured to generate a control message that includes a value indicative of the aggregate capacity value and a value indicative of the minimum signal strength.

14. The apparatus of claim 13 wherein the radio communication system comprises a mobile station, wherein the control message generated by said message generator is broadcast to the mobile station.

15. The apparatus of claim 14 wherein the mobile station comprises a radio sub-system selector adapted to receive the control message, from which a radio sub-system selection is made according to an aggregate capacity value and a signal strength indicia.

16. Apparatus for facilitating radio sub-system selection by a mobile station of a radio communication system having a plurality of radio sub-system, said apparatus comprising:

a control message detector adapted to detect reception at the mobile station of a control message, the control message including an aggregate capacity value representative of radio communication system capacities that include core network communications capacity, backhaul network communications capacity, and radio network communications capacity; and a radio sub-system selector adapted to receive the aggregate capacity value of the control message detected by said control message detector, said radio sub-system selector configured to perform the radio sub-system selection responsive to the aggregate capacity value.

17. A method for facilitating radio sub-system selection in a radio communication system having a plurality of radio sub-systems, said method comprising the operations of:

collecting indications of radio communication system capacities that include core network communications capacity, backhaul network communications capacity, and radio network communications capacity;

determining an aggregate capacity value from the product of the core network communications capacity, the backhaul network communications capacity, and the radio network communications capacity, the aggregate capacity value being used to select a radio sub-system.

18. The method of claim 17 further comprising the operation of forming a control message that includes the aggregate capacity value.

19. The method of claim 18 wherein the radio communication system comprises a mobile station and wherein said method further comprises the operations of:

sending the control message to the mobile station; and selecting the radio sub-system at the mobile station responsive to the aggregate capacity value contained in the control message.

20. The method of claim 17 wherein the radio communication system comprises a core network, a backhaul network, and a radio access network, and wherein the aggregate capacity value determined during said operation of determining comprises a combination of core network capacity indicia, backhaul network capacity indicia, and radio access network capacity indicia.

21. The method of claim 20 wherein the aggregate capacity value comprises a product of values representative of the core network capacity indicia; of the backhaul network capacity indicia, and of the radio access network capacity indicia.

22. A method in a mobile station for selecting a particular radio sub-system of a plurality of radio sub-systems in a radio access network, the method comprising:

receiving a control message having an aggregate capacity value, the aggregate capacity value based upon at least the core network communications capacity, backhaul network communications capacity, and radio network communications capacity of the radio access network; and selecting a particular radio sub-system in response to the aggregate capacity value in the received control message.

* * * * *